United States Patent [19]
Andersen

[11] Patent Number: 6,122,740
[45] Date of Patent: *Sep. 19, 2000

[54] METHOD AND APPARATUS FOR REMOTE NETWORK ACCESS LOGGING AND REPORTING

[75] Inventor: David B. Andersen, Hillsboro, Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/769,373

[22] Filed: Dec. 19, 1996

[51] Int. Cl.$^7$ ...................................................... G06F 12/14
[52] U.S. Cl. ............................................................ 713/200
[58] Field of Search .............................. 395/186, 187.01, 395/200.59, 188.01; 380/4, 9, 23, 25; 707/9; 713/200, 201, 202; 709/229

[56] References Cited

U.S. PATENT DOCUMENTS

| | | | |
|---|---|---|---|
| 5,237,614 | 8/1993 | Weiss | 380/23 |
| 5,241,594 | 8/1993 | Kung | 380/4 |
| 5,572,643 | 11/1996 | Judson | 395/793 |
| 5,611,049 | 3/1997 | Pitts | 395/200.09 |
| 5,682,478 | 10/1997 | Watson et al. | 395/200.12 |
| 5,696,898 | 12/1997 | Baker et al. | 395/187.01 |
| 5,706,507 | 1/1998 | Schloss | 707/9 |
| 5,892,902 | 4/1999 | Clark | 713/201 |

OTHER PUBLICATIONS

Georgia, Bonny L., "Smut Stoppers: Five Internet blocking packages for your family", *Family PC*, Mar. 1996, 5 pages.

"Microsystems Announces Cyber Patrol Proxy to Support Microsoft's Proxy Server: Filtering Software Available at a Discount for Users of the Microsoft Proxy Server", Microsystems Software, Inc. Press Release, Oct. 28, 1996, 3 pages.

"Microsystems Announces Immediate Availability of Cyber Patrol Proxy for Microsoft's Proxy Server: Internet Filtering Solution Extends Microsystems' Presence in Corporate Markets; Company Plans for Integration With Additional Proxy Servers", Microsystems Software, Inc. Press Release, Jul. 31, 1996, 3 pages.

"Microsystems Releases Cyber Corporate for Office and Business Use: Leading Internet Filter Lets Businesses Restrict Content Not Suited to the Office", Microsystems Software, Inc. Press Release, Nov. 18, 1996, 3 pages.

"Spyglass Previews SurfWatch ProServer: First Internet Proxy Server With SurfWatch Filtering Built–In; SurfWatch ProServer Allows Content Choices and Improves Network Performance for Corporations, Schools, and Internet Providers", Spyglass Inc. Press Release, Jul. 30, 1996, 3 pages.

"SurfWatch ProServer from Spyglass", Spyglass Inc. Products and Services Guide, 4 pages.

*Primary Examiner*—Robert W. Beausoliel, Jr.
*Assistant Examiner*—Pierre Eddy Elisca
*Attorney, Agent, or Firm*—Blakely, Sokoloff, Taylor & Zafman LLP

[57] ABSTRACT

A method and apparatus for remote network access logging and reporting intercepts an access request at a client system on a network and sends log data identifying the access request to a log server on the network. According to one embodiment, the client system receives an access list from the log server and compares the access request to the access list. In this embodiment, access to the host system is allowed only if the request does not conflict with the access list. According to another embodiment, the client system receives an access list from the log server and compares the access request to the access list. In this embodiment, the log data is sent to the log server only if the request conflicts with the access list.

19 Claims, 9 Drawing Sheets

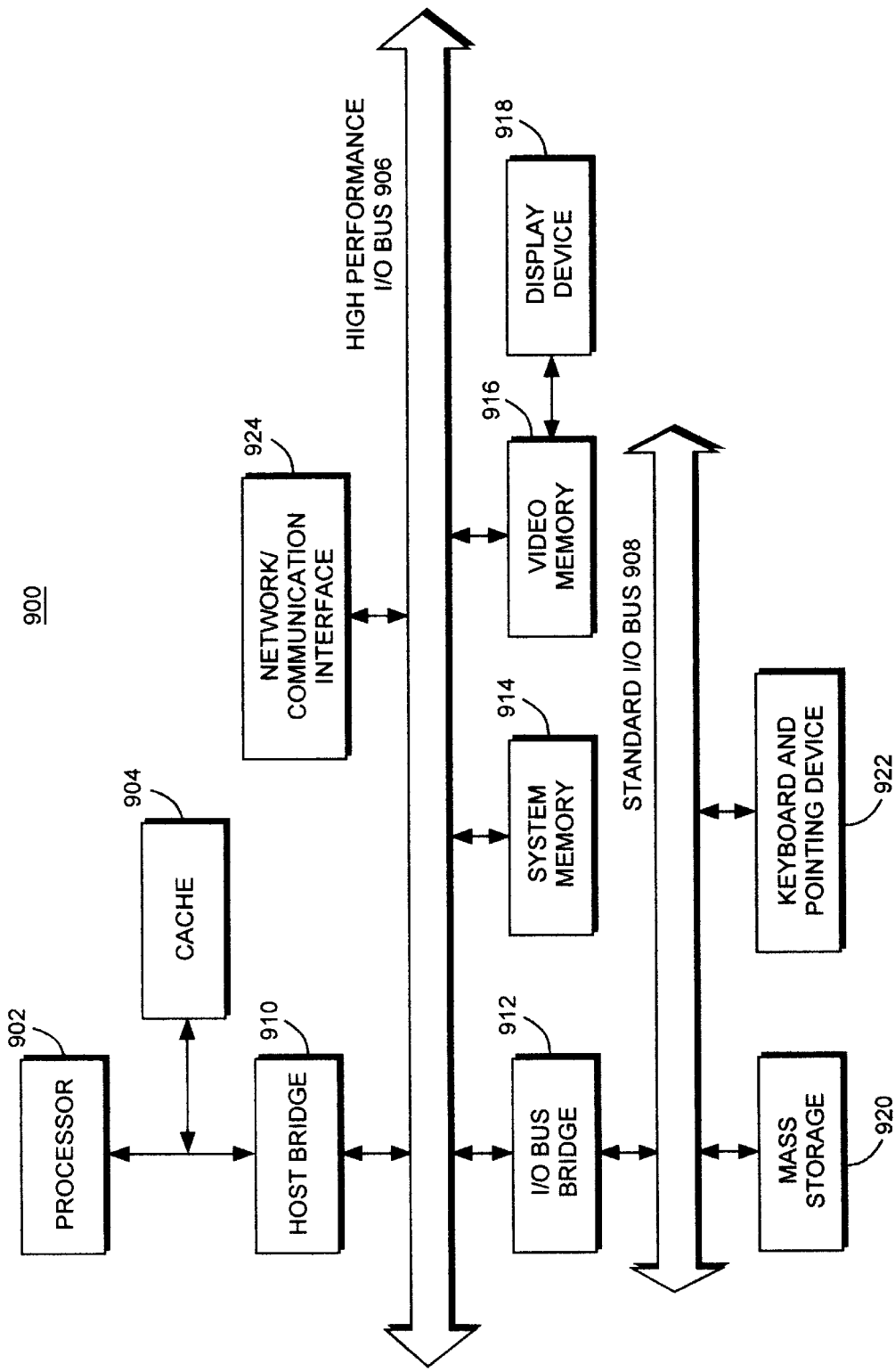

METHOD AND APPARATUS FOR REMOTE NETWORK ACCESS LOGGING AND REPORTING

BACKGROUND OF THE INVENTION

1. Field of the Invention

The present invention pertains to the field of networks. More particularly, this invention relates to remote logging of accesses on a network.

2. Background

As computer technology has advanced the use of networks has continually increased. A network refers to a system which can couple together two or more computer systems such that the systems can communicate with one another. One problem that arises with the use of networks is that they allow individuals to access systems other than those they are supposed to be accessing. For example, children are able to access adult-oriented systems and employees are able to access non-work related systems.

One solution to the problem of individuals accessing systems other than those they are supposed to be accessing is to provide, on an individual's system, a list of unacceptable computer systems and prevent the individual from accessing any of the unacceptable systems. Another solution is to maintain, on an individual's system, a record of systems which have been accessed by the individual and have a supervisor periodically check the record to identify inappropriate systems being accessed.

However, one problem with both of these solutions is that the user, especially a knowledgeable computer user, could access the appropriate lists or records on his or her system and modify them to his or her own choosing. Thus, it would be beneficial to maintain a log of accesses to inappropriate systems, as well as possibly providing a way to prohibit access to such systems, which would be inaccessible to a system user.

As will be described in more detail below the present invention provides a method and apparatus for remote network access logging and reporting which achieves these and other desired results which will be apparent to those skilled in the art from the description that follows.

SUMMARY OF THE INVENTION

A method and apparatus for remote network access logging and reporting is described herein. The present invention intercepts an access request at a client system on a network and sends log data identifying the access request to a log server on the network.

According to one embodiment of the present invention, the client system receives an access list from the log server and compares the access request to the access list. In this embodiment, access to the host system is allowed only if the request does not conflict with the access list. According to another embodiment of the present invention, the client system receives an access list from the log server and compares the access request to the access list. In this embodiment, the log data is sent to the log server only if the request conflicts with the access list.

BRIEF DESCRIPTION OF THE DRAWINGS

The present invention is illustrated by way of example and not limitation in the figures of the accompanying drawings, in which like references indicate similar elements and in which:

FIG. 9 illustrates one embodiment of a hardware system suitable for use with the present invention.

DETAILED DESCRIPTION

In the following description, various aspects of the present invention will be described. However, it will be understood by those skilled in the art that the present invention may be practiced with only some or all aspects of the present invention. For purposes of explanation, specific numbers, materials and configurations are set forth in order to provide a thorough understanding of the present invention. However, it will also be apparent to those skilled in the art that the present invention may be practiced without these specific details.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention provides a method and apparatus for remote network access logging and reporting. When an access to a network system is made by a user, log data regarding the request is transferred to and saved at a remote system. This saved data is then made available for an authorized individual to review and thereby receive data regarding the user's network accesses.

Figure 1:
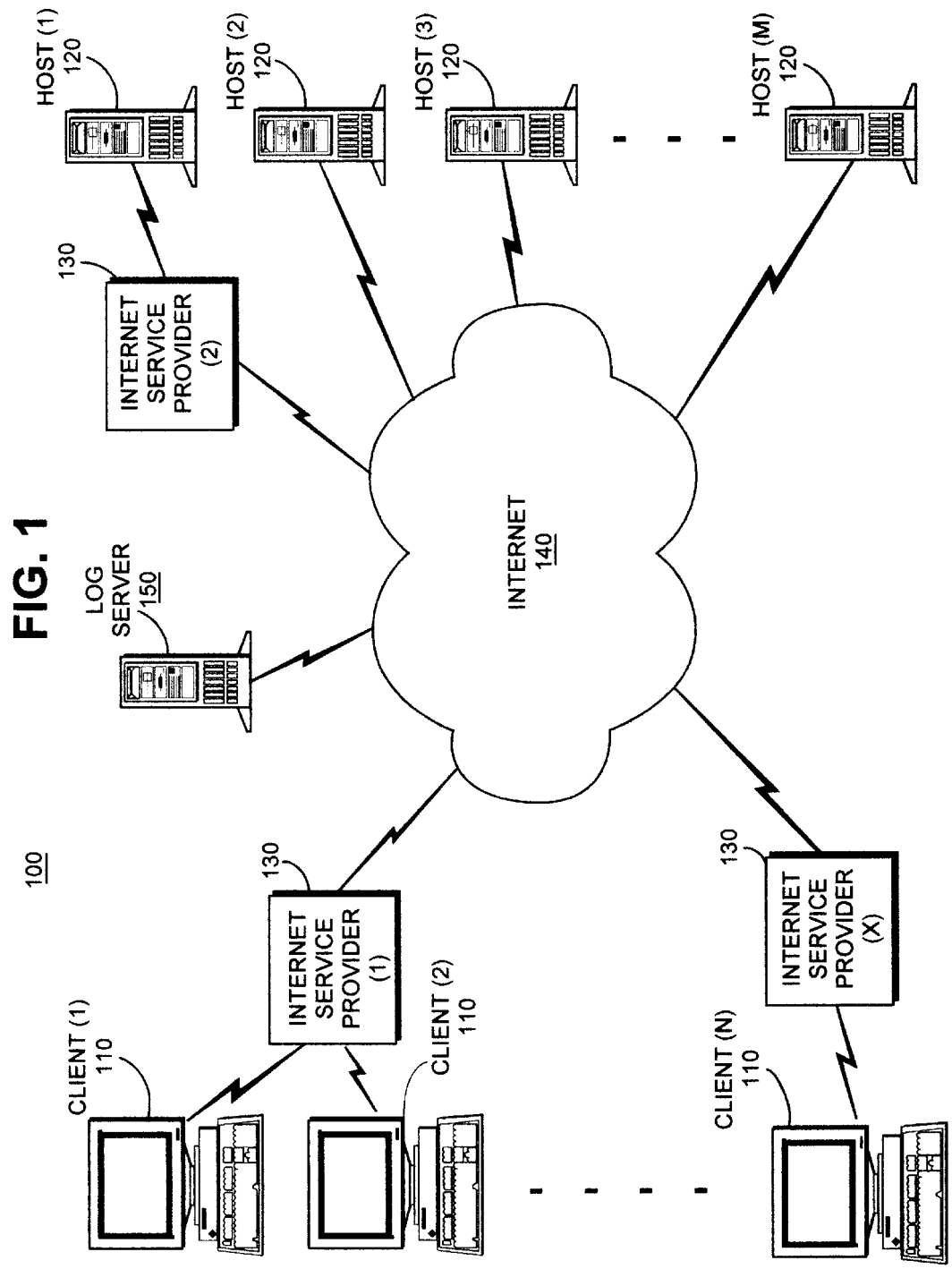
FIG. 1 is a block diagram illustrating a network environment in which the present invention may be practiced.

FIG. 1 is a block diagram illustrating a network environment in which the present invention may be practiced. As illustrated, network environment 100 includes multiple (N) client systems 110 and multiple (M) host systems 120, collectively referred to as network systems. Network environment 100 also includes multiple (X) internet service providers (ISPs) 130, the Internet 140, and a log server 150. Each client system 110 can be any of a wide range of computing devices which provide a user with the ability to access the internet 140.

Each ISP 130 is typically a computer system having a large amount of storage space (typically on the order of hundreds of gigabytes or terabytes) and multiple communication lines for accessing both the client systems 110 and the Internet 140.

Each host system 120 is also typically a computer system which can be accessed by the client systems 110. According to one embodiment, each host system 120 includes one or more HyperText Markup Language (HTML) compatible web pages which can be accessed via the HyperText Transfer Protocol (HTTP) and displayed by an HTML compatible Internet browser running on a client system 110. In this embodiment, an individual user can access a host system 120 by entering an identifier of a web page at that system, referred to as a Uniform Resource Locator (URL). In addition, each host system 120 may also contain one or more data files which can be accessed by the client systems 110. These data file(s) may be accessed via HTTP, or alternatively other protocols, such as the file transfer protocol (FTP).

Each of the host systems 120 typically includes "site description" information. The site description information for a host system 120 is a brief description identifying the information available from the host system. Examples of site description information include both keyword lists and abstracts. In one embodiment, each host system 120 can contain multiple HTML compatible web pages, and each web page can have its own site description information.

Log server 150 is also typically a computer system having a large amount of storage space for storing log data in accordance with the present invention. Log data is transferred to log server 150 from one or more client systems 110 and stored by log server 150 until the information is requested by a verified user, as discussed in more detail below. It is to be appreciated that although only a single log server 150 is illustrated in FIG. 1, any number of servers 150 can be coupled to the Internet 140.

The Internet 140 is a combination of multiple conventional hardware components, including computer systems, routers, repeaters, gateways, and communications links spread throughout the world. These hardware components are organized hierarchically to provide multiple logical levels of networks. The hardware components of Internet 140 interact to route data from one computer system to another. According to one implementation, data is transferred between computer systems using the well-known Transmission Control Protocol/Internet Protocol (TCP/IP) protocol. The data is typically transferred in units referred to as "packets" or "datagrams". Typically, each packet includes data, a source address identifying the system which initiated the packet and a target address identifying the system to which the packet is to be sent. Additional control information, such as a checksum, may also be included in the packet. The number of bytes of data contained within a packet is dependent on the network protocol being used.

The communication links illustrated in FIG. 1 may be any of a wide range of conventional communication media, and may be different for different systems 110, host systems 120, ISPs 130, and log servers 150. For example, a communication link may be a cable, a fiber-optic cable, or may represent a nonphysical medium transmitting electromagnetic signals in the electromagnetic spectrum. Additionally, a communication link may also include any number of conventional routing or repeating devices, such as satellites or electromagnetic signal repeaters.

It is to be appreciated that although the client systems 110 and host systems 120 are illustrated as being different machines, a single hardware system may be both a client system and a host system. If the hardware system is initiating an access for information to another system then the hardware system is referred to as a client system. However, if the hardware system is being accessed by another system to obtain information from the hardware system then the hardware system is referred to as a host system.

It is to be appreciated that additional networks may also be included in the network environment 100. For example, multiple client systems 110 may be coupled together in an Ethernet, token ring, or other conventional network and access an ISP 130 through this additional network.

Figure 2:
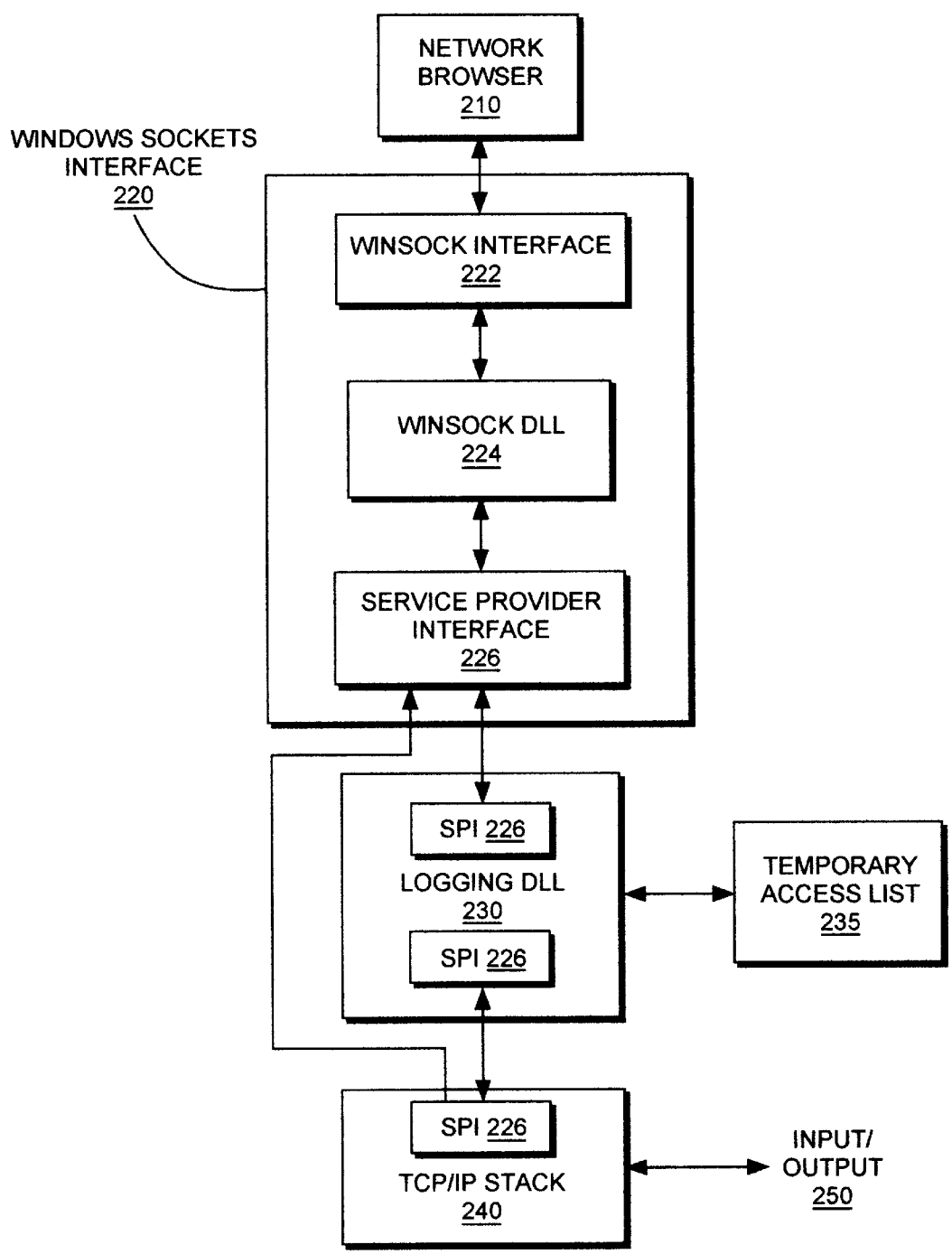
FIG. 2 is a simplified block diagram illustrating a system architecture such as may be used with one embodiment of the present invention.

FIG. 2 is a simplified block diagram illustrating a system architecture such as may be used with one embodiment of the present invention. As shown, the system architecture includes a network browser 210, a Windows Sockets interface 220, a logging dynamic link library (DLL) 230, an access list 235, and a TCP/IP stack 240. According to one embodiment of the present invention, the elements of FIG. 2 are included on one or more client systems 10 of FIG. 1.

Network browser 210 provides a user interface, such as a graphical user interface (GUI), which allows an individual to send information to and receive information from another network system. According to one embodiment of the present invention, network browser 210 is an HTML compatible Internet browser, such as Navigator™, available from Netscape Communications of Mountain View, Calif. It is to be appreciated, however, that browser 210 can be any of a wide variety of conventional interfaces which allow an individual user to access other network systems.

Windows Sockets interface 220 is, according to one embodiment, a Windows Sockets 2 interface, as defined in the Windows Sockets 2 Service Provider Interface Specification, Revision 2.2.0, dated May 10, 1996, the Windows Sockets 2 Application Programming Interface, Revision 2.2.0, dated May 10, 1996, and the Windows Sockets 2 Protocol-Specific Annex, Revision 2.0.3, dated May 10, 1996. Alternatively, the Windows Sockets interface 220 may be a Windows Sockets 1.1 interface, as defined in the Windows Sockets Interface Specification, Version 1.1, dated Jan. 20, 1993.

WinSock Interface 222 provides an application programming interface (API) which allows network browser 210 to communicate with Windows Sockets interface 220. Service provider interface (SPI) 226 provides an interface which allows the service provider (for example, logging DLL 230 or TCP/IP stack 240) to communicate with Windows Sockets interface 220. WinSock DLL 224 translates information received via interface 226 into the format expected by browser 210, and similarly translates information received via interface 222 into the format expected by entities that support the WinSock service provider interface, such as logging DLL 230 and TCP/IP stack 240.

Upon installation, logging DLL 230 calls the WSCInstallProvider function of Windows Sockets interface 220, identifying logging DLL 230 as the default destination for messages from interface 226 of Windows Sockets interface 220. Therefore, Windows Sockets interface 220 provides data from network browser 210 to logging DLL 230 rather than directly to TCP/IP stack 240. During operation, logging DLL 230 receives requests from Windows Sockets interface 220. The request as received from Windows Sockets interface 220 may be forwarded to TCP/IP stack 240, as discussed in more detail below. Additionally, the identifier of the host system being accessed, for example the URL of the host system being accessed, may be extracted from the request and be included as the log data to be forwarded to log server 150 of FIG. 1, as discussed in more detail below. Additional log data may also be included by logging DLL 230, such as the date of the access, the time of the access, the elapsed time since the last host system was accessed, etc. Furthermore, according to one embodiment of the present invention, logging DLL 230 can provide site description information as part of the log data. For example, browser 210 may maintain a list of keywords or abstracts of certain sites being accessed by the individual user. If this list is maintained, then the keywords or abstract of the host system being accessed is included as part of the log data.

Additionally, logging DLL 230 is also coupled to a temporary access list 235. Temporary access list 235 is a list of host systems which are not to be accessed by the user of the system. Alternatively, access list 235 may be a list of only those systems which can be accessed by the user. In the illustrated embodiment access list 235 is obtained from log server 150 and is stored in volatile memory, such as the random access memory (RAM) of the system. The use of access list 235 by logging DLL 230 is discussed in more detail below. It should be noted that the data in temporary access list 235 could also be encrypted in any of a wide variety of conventional manners, and decrypted by logging DLL 230 whenever accessed.

TCP/IP stack 240 supports the WinSock service provider interface 226 and thus can communicate with both Windows Sockets interface 220 and logging DLL 230, as well as the Internet. Requests to access network systems, as well as packets of log data destined for log server 150, are received by TCP/IP stack 240 and forwarded to the targeted location as input/output 250. Additionally, packets of data received from external sources are received as input/output 250 and forwarded to Windows Sockets interface 220 by TCP/IP stack 240.

It is to be appreciated that although the present invention is described with reference to the Windows Sockets interface and as conforming to the TCP/IP protocol, the present invention can be used with any of a wide range of conventional network protocols.

It is also to be appreciated that although logging DLL 230 is illustrated in FIG. 2 as being implemented between Windows Sockets interface 220 and TCP/IP stack 240, the present invention could be implemented in any of a wide variety of conventional manners. For example, the present invention could be implemented as a series of software routines executing in network browser 210.

Figure 3:
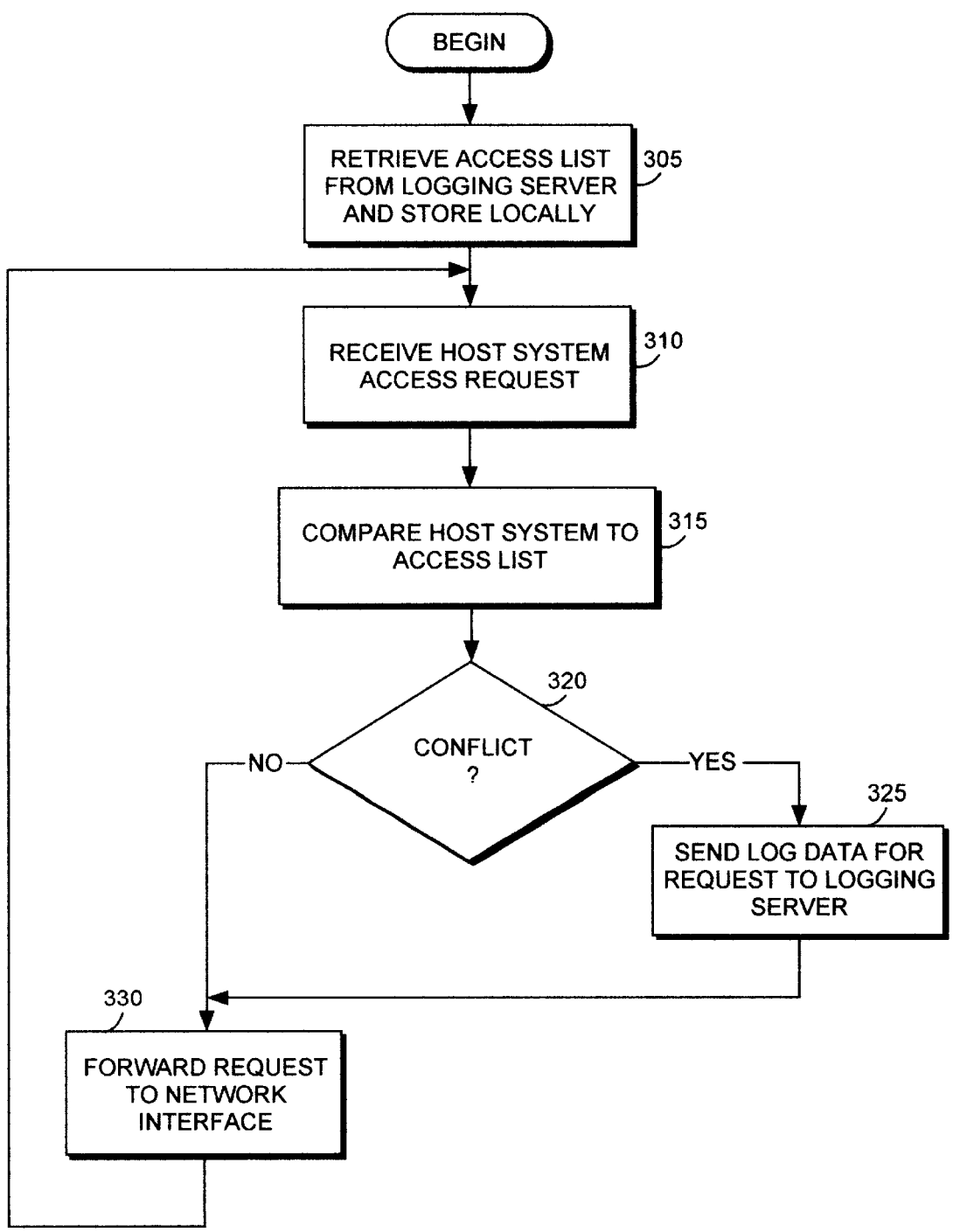
FIG. 3 is a flowchart illustrating the steps followed in logging network accesses according to one embodiment of the present invention.

FIG. 3 is a flowchart illustrating the steps followed in logging network accesses according to one embodiment of the present invention. Initially, the logging DLL executing on a client system retrieves an access list from a logging server and stores the access list locally on the client system, step 305. In the illustrated embodiment, this retrieval is performed when the logging DLL begins running. However, it is to be appreciated that in alternate embodiments this retrieval can be performed at different times, such as at periodic periods after the logging DLL begins running.

Once the access list is retrieved, the logging DLL is able to receive requests from a user (via the network browser). The logging DLL receives a request to access a host system, step 310, and compares the host system to the locally stored access list, step 315. The logging DLL then checks whether the request conflicts with the access list, step 320. If the request does not conflict with the access list, then the logging DLL forwards the request to the host system (via TCP/IP stack 240 of FIG. 2), step 330. However, if the request does conflict with the access list, then the logging DLL sends log data for the request to the logging server, step 325, as well as forwarding the request to the host system, step 330. As discussed above, this log data can include any of a wide range of data including the identification of the requested host system, the date and time of the request, etc.

It is to be appreciated that a conflict, as checked for in step 320, can be identified in any of a wide range of conventional manners. According to one implementation, the access list includes a list of network identifiers which are not to be accessed by the user of the system. An identifier received in step 310 which is in this list conflicts with the list. According to another implementation, the access list is a list of words or phrases. If the host corresponding to the identifier received in step 310 contains any of the words or phrases (or alternatively, does not contain any of the words or phrases), then the identifier received in step 310 conflicts with the list. Various host systems and possibly ISPs include search engines which enable an individual to search for particular host systems which include data of interest. These search engines often contain a list of words, such as a site description, which identify the information available from the host systems via the Internet. The logging DLL on a client system could copy the site description information from a host system or a search engine and then use this copied list to identify conflicts. If the logging DLL receives an identifier corresponding to a host system which has words which are contained in the list, then a conflict is identified.

Figure 4:
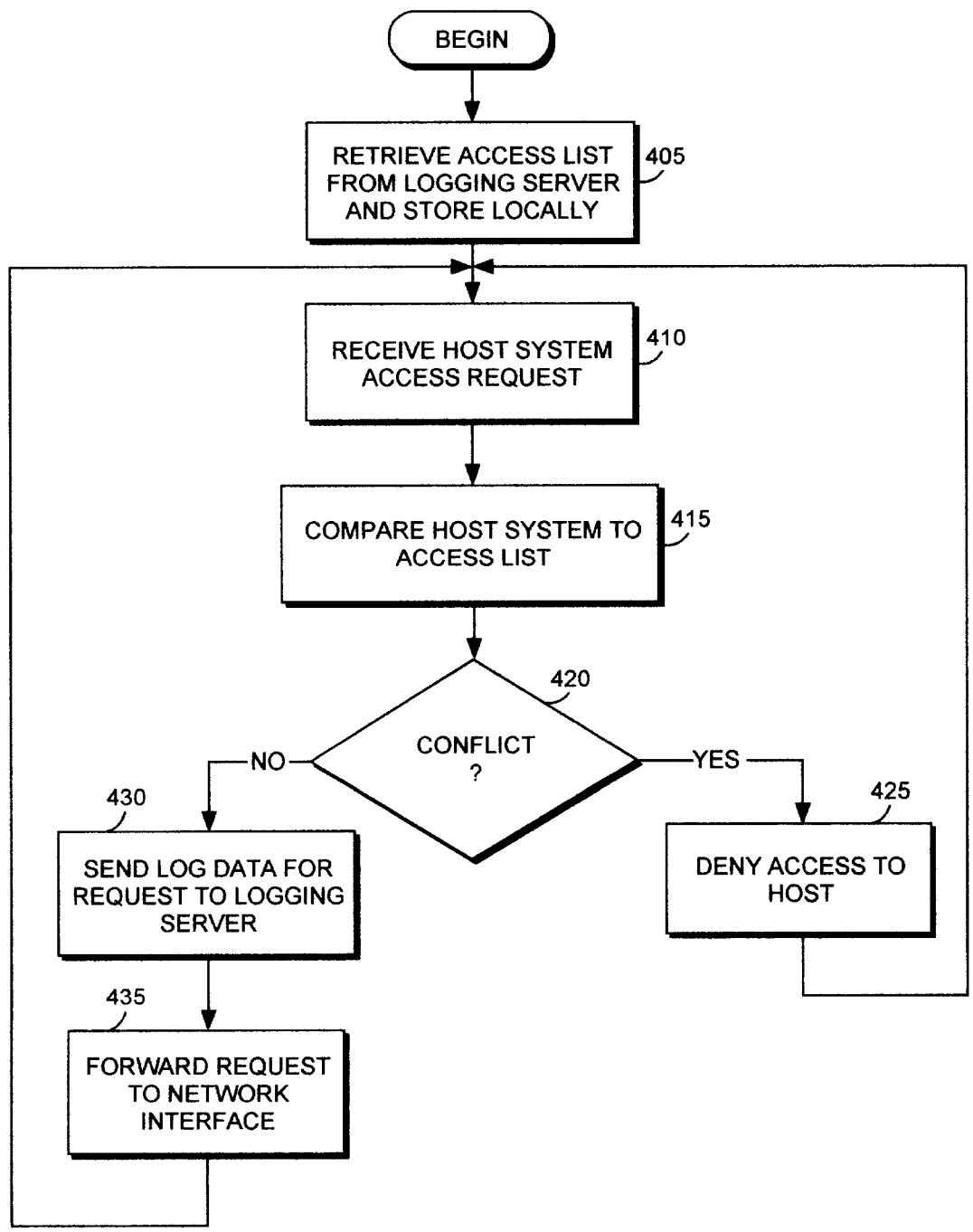
FIG. 4 is a flowchart illustrating the steps followed in logging network accesses according to an alternate embodiment of the present invention.

FIG. 4 is a flowchart illustrating the steps followed in logging network accesses according to an alternate embodiment of the present invention. Initially, the logging DLL executing on a client system retrieves an access list from a logging server and stores the access list locally on the client system, step 405. The logging DLL then receives a request to access a host system, step 410, compares the host system to the locally stored access list, step 415, and checks whether the request conflicts with the access list, step 420. Steps 405, 410, 415 and 420 of FIG. 4 are analogous to Steps 305, 310, 315 and 320 of FIG. 3, respectively.

If the request is identified as conflicting with the access list in step 420, then access to the requested host system is denied, step 425. In one embodiment, access is denied by the logging DLL not forwarding the request to TCP/IP stack 240 of FIG. 2. The logging DLL ignores the request, and in one implementation returns a message to the user that access to the requested host system has been denied. In an alternate implementation, the logging DLL returns an indication to the user that the requested system could not be located. This indication is the same indication that the browser would receive if a particular system could not be accessed (for example, because the addressed location could not be found) so as not to alert the user to the operation of the present invention.

Returning to step 420, if the request does not conflict with the access list, then the logging DLL sends log data for the request to the logging server, step 430. As discussed above, this log data can include any of a wide range of data, including the identification of the requested host system, the date and time of the request, etc. The logging DLL also forwards the request to the host system (via TCP/IP stack 240 of FIG. 2), step 435.

Figure 5:
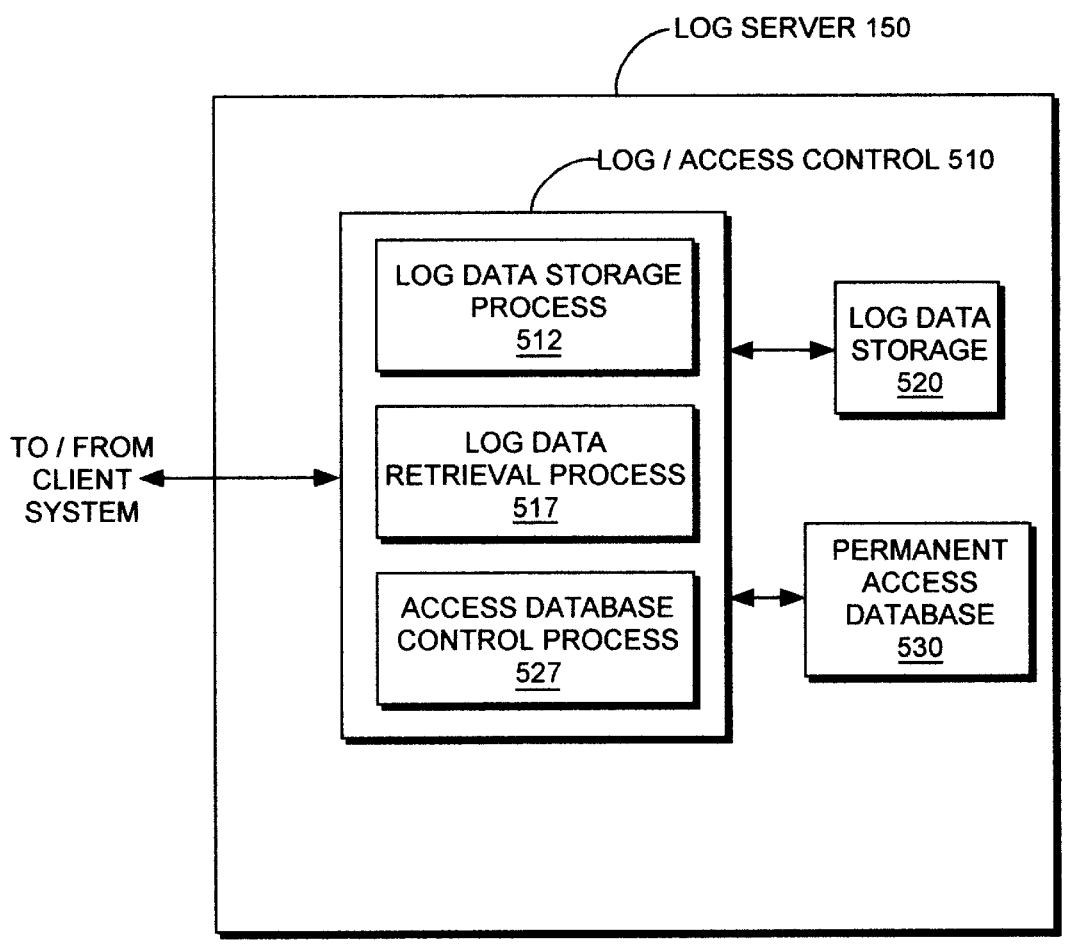
FIG. 5 is a functional block diagram illustrating a log server according to one embodiment of the present invention.

FIG. 5 is a functional block diagram illustrating a log server according to one embodiment of the present invention. The log server 150 illustrated in FIG. 5 includes log/access control 510, log data storage 520, and permanent access database 530. Log/access control 510 controls the storage and retrieval of data in both log data storage 520 and permanent access database 530.

Upon receipt of log data from a client system, log data storage process 512 stores the received log data, as well as an identifier of the client system from which the log data was received, in log data storage 520. Log data storage process 512 also obtains site description information, if any, corresponding to the received log data as discussed in more detail below.

Upon receipt of a request for log data regarding a particular user or client system, log data retrieval process 517 verifies that the user is authorized to access the requested log data and forwards the requested log data to the user. Log data retrieval process 517 also organizes the requested log data, if necessary, to conform to the preferences of the requester.

Access database control process 527 controls the storage of access information to and retrieval of access information from permanent access database 530. Permanent access database 530 stores access lists corresponding to particular client systems in nonvolatile memory. Upon receiving a request for an access list, control process 527 retrieves a copy of the requested access list from database 530 and returns the copy to the requester. Similarly, upon receiving a request to add or remove host systems from a particular access list, control process 527 performs the requested addition or removal.

Figure 6:
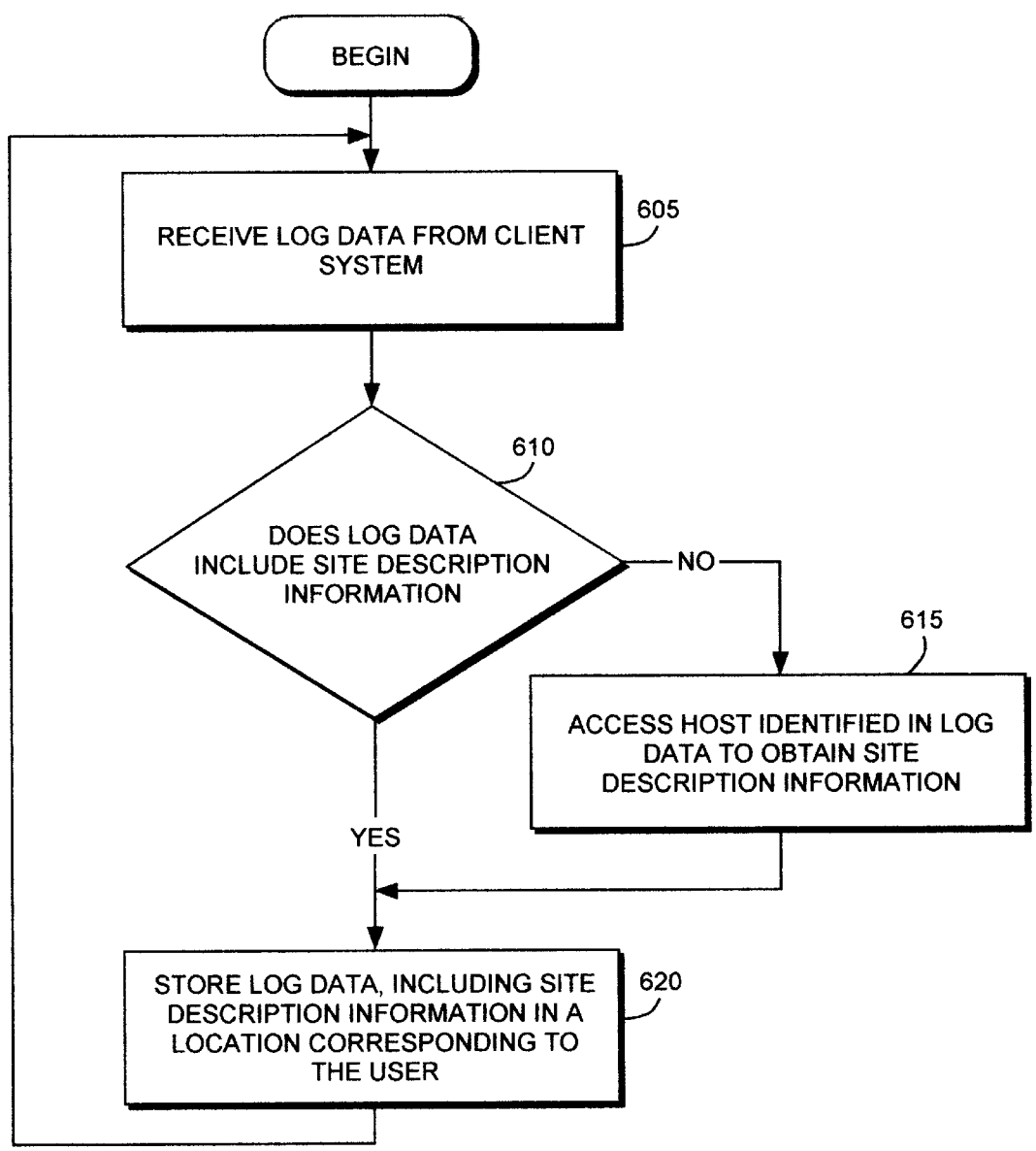
FIG. 6 is a flowchart illustrating the steps taken in recording data at a log server according to one embodiment of the present invention.

FIG. 6 is a flowchart illustrating the steps taken in recording data at a log server according to one embodiment of the present invention. The log server first receives log data from a client system, step 605. The log data storage process then checks whether the log data includes site description information, step 610. If the log data storage process does not include site description information, then the log data storage process accesses the host system identified in the log data in order to obtain site description information for that host system, step 615. After obtaining the site description information, either from the client system as part of the log data or in step 615, the log data storage process stores the log data, including the site description information, in a location corresponding to the user, step 620. In the illustrated embodiment, the log server can support multiple users and stores each of their information separately.

The log data storage process can obtain the site description information in any of a wide variety of manners. For example, the log data storage process could obtain the site description information from the host system, or alternatively the log data storage process could access a search engine on another host system or ISP to obtain the site description information. According to one implementation, the log data storage process obtains the site description information by sending a message to the host system (or search engine) identifying a particular host system and requesting either the list of key words for that system or an abstract for that system.

In an alternate embodiment, the site description information is not obtained by the log server. In this embodiment, steps 610 and 615 are not included, and the log data storage process stores whatever log data, if any, is sent to it by the client systems in step 605.

Figure 7:
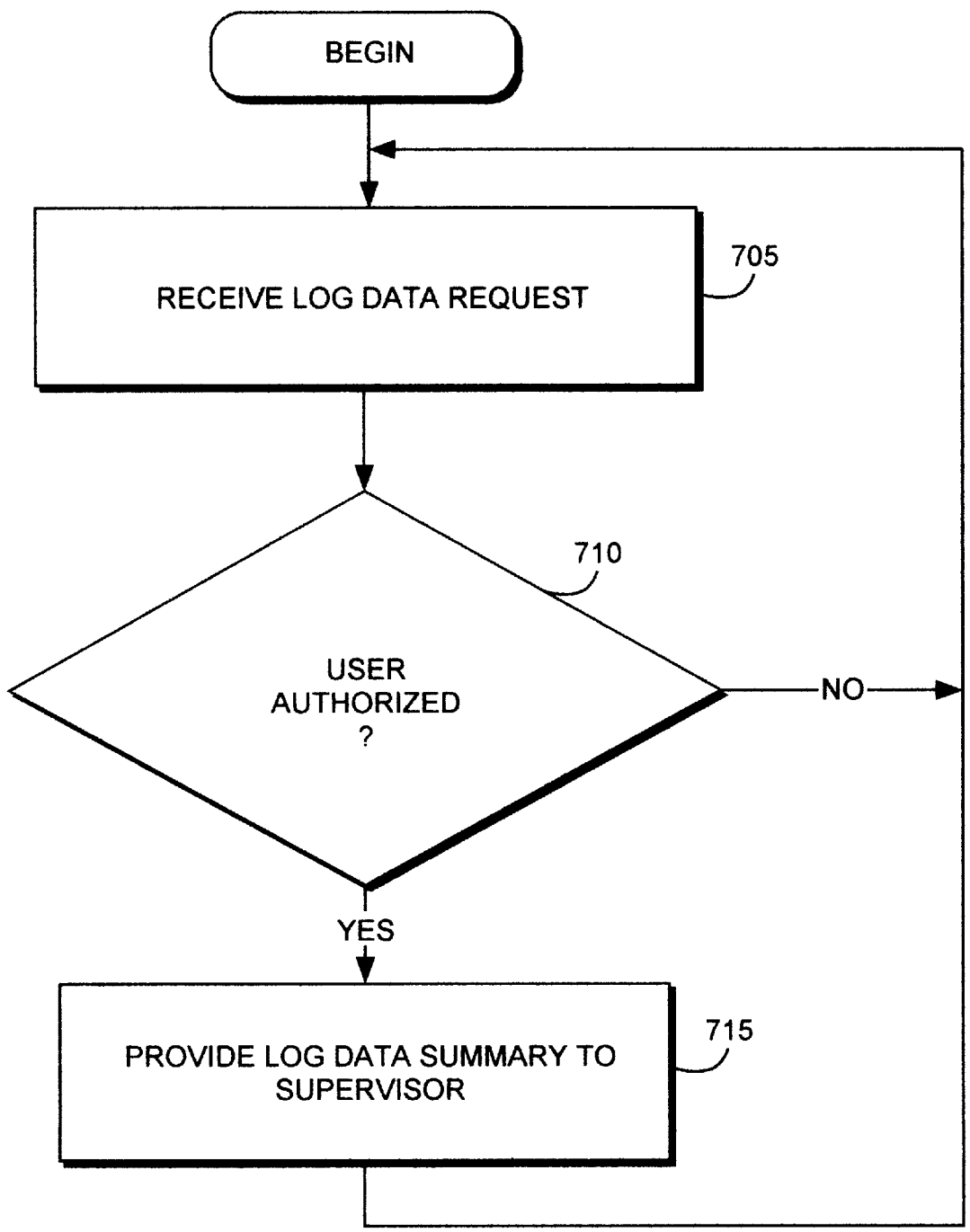
FIG. 7 is a flowchart illustrating the steps followed in reporting log data according to one embodiment of the present invention.

FIG. 7 is a flowchart illustrating the steps followed in reporting log data according to one embodiment of the present invention. The log server first receives a request for the log data from a supervisor, step 705. A "supervisor" refers to an individual user who wishes to access the log data from other users. This request can be received from any of the client systems 110 shown in FIG. 1. The log data retrieval process then checks whether the supervisor is authorized to view the log data, step 710. This verification can be done in any of a wide variety of conventional manners, such as requiring a user identification and a password. If the supervisor is not authorized, then no data is transferred to the supervisor and the log server returns to accept another request in step 705. However, if the supervisor is authorized, then the log data retrieval process provides a summary of the log data to the supervisor, step 715.

Figure 8:
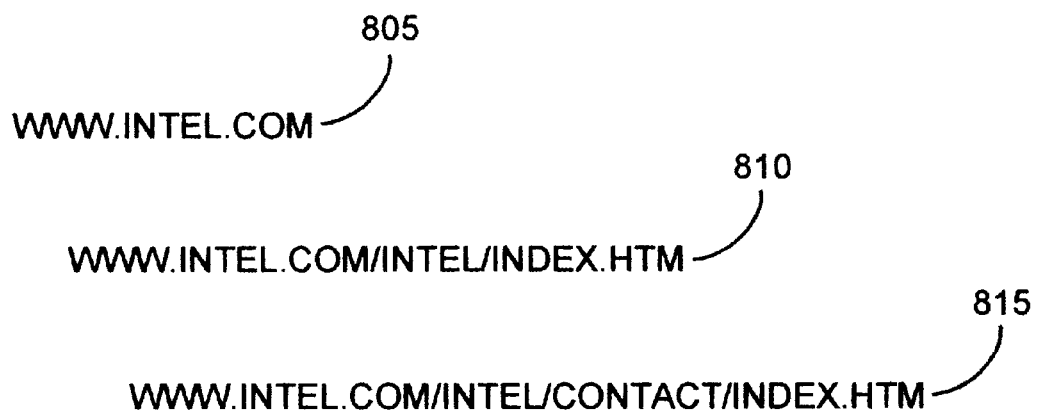
FIG. 8 illustrates a display of log data such as may be displayed according to one embodiment of the present invention.

According to one embodiment of the present invention, the supervisor can set a user preference with the log server indicating the format that the summary of log data should be in. According to one implementation, one user preference is a hierarchical setting. The log data retrieval process obtains all the log data for the specified user since the last time the supervisor checked the log data and then displays the log data hierarchically, as illustrated in FIG. 8. As illustrated, a first web page 805 accessed may have an URL of "www.intel.com". The second web page 810 accessed may have an URL of "www.intel.com/intel/index.htm", and the third web page 815 accessed may have an URL of "www.intel.com/intel/contact/index.htm". Thus, as illustrated, the second web page 810 and the third web page 815 are displayed hierarchically as being below and offset from the first web page 805. It is to be appreciated that additional site description information (not shown) may also be displayed along with the URLs accessed.

It is to be appreciated that other user preferences can also be set. For example, a user may request chronological ordering, or alternatively only those host systems accessed with site descriptions that contain a particular one or more words identified by the supervisor.

According to one embodiment of the present invention, once authorization for the supervisor to access the log data has been verified, the supervisor can also change the access list for the user. As discussed above, a permanent access list is stored at the log server and is copied to the client system for temporary storage and use. Thus, any changes to the permanent access list can be made by the supervisor when accessing the log server.

Additionally, according to one embodiment of the present invention, a supervisor need not access the log server in order to check the log data. In this embodiment, the log data retrieval process periodically sends the log data to the supervisor using electronic mail. Alternatively, the log data retrieval process could compare log data to a predetermined list of words or sites at the log server (for example, the access list discussed above). If an access matches any of the words in the predetermined list of words, then the log data retrieval process could alert the supervisor to an inappropriate access. The supervisor could be alerted in any of a wide range of manners, such as by sending an electronic mail message to the supervisor indicating the site that was accessed, by sending a wireless page to a conventional pager used by the supervisor, or by calling a phone number (e.g., for a cellular phone) used by the supervisor and playing an audible alert message.

FIG. 9 illustrates one embodiment of a hardware system suitable for use with the present invention. In one embodiment, each of the client systems 110, host systems 120, log server 150 illustrated in FIG. 1 are hardware systems 900 of FIG. 9. In the illustrated embodiment, hardware system 900 includes processor 902 and cache memory 904 coupled to each other as shown. Additionally, hardware system 900 includes high performance input/output (I/O) bus 906 and standard I/O bus 908. Host bridge 910 couples processor 902 to high performance I/O bus 906, whereas I/O bus bridge 912 couples the two buses 906 and 908 to each other. Coupled to bus 906 are network/communication interface 924, system memory 914, and video memory 916. In turn, display device 918 is coupled to video memory 916. Coupled to bus 908 is mass storage 920 and keyboard and pointing device 922.

These elements 902–922 perform their conventional functions known in the art. In particular, network/communication interface 924 is used to provide communication between system 900 and any of a wide range of conventional networks, such as an Ethernet, token ring, the Internet, etc. It is to be appreciated that the circuitry of interface 924 is dependent on the type of network the system 900 is being coupled to.

Mass storage 920 is used to provide permanent storage for the data and programming instructions to implement the above described functions, whereas system memory 914 is used to provide temporary storage for the data and programming instructions when executed by processor 902. Mass storage 920 may be provided with the programming instructions by loading the programming instructions from a distribution storage medium (not shown), or by downloading the programming distributions from a server (not shown) coupled to hardware system 900 via network/communication interface 924. Collectively, these elements are intended to represent a broad category of hardware systems, including but not limited general purpose computer systems based on the Pentium® processor or Pentium® Pro processor, manufactured by Intel Corporation of Santa Clara, Calif.

It is to be appreciated that various components of hardware system 900 may be rearranged. For example, cache 904 may be on-chip with processor 902. Furthermore, certain implementations of the present invention may not require nor include all of the above components. For example, mass storage 920, keyboard and pointing device 922, and/or display device 918 and video memory 916 may not be included in system 900. Additionally, the peripheral devices shown coupled to standard I/O bus 908 may be coupled to high performance I/O bus 906; in addition, in some implementations only a single bus may exist with the components of hardware system 900 being coupled to the single bus. Furthermore, additional components may be included in system 900, such as additional processors, storage devices, or memories.

In one embodiment, the method and apparatus for remote network access logging and reporting discussed above is implemented as a series of software routines run by a hardware system of FIG. 9. These software routines comprise a plurality or series of instructions to be executed by a processor in a hardware system, such as processor 902 of FIG. 9. Initially, the series of instructions are stored on a storage device, such as mass storage 920. The instructions are copied from storage device 920 into memory 914 and then accessed and executed by processor 902. In one implementation, these software routines are written in the C++ programming language. It is to be appreciated, however, that these routines may be implemented in any of a wide variety of programming languages. In alternate embodiments, the present invention is implemented in discrete hardware or firmware. For example, an application specific integrated circuit (ASIC) could be programmed with the above described functions of the present invention.

In several of the discussions above, the network environment is described as being the Internet. It is to be appreciated, however, that the present invention can be used with any type of network environment and is not limited to the Internet.

It is also to be appreciated that the present invention can be used for the remote logging of any of a wide variety of activities which can be engaged in on a client system. For example, a client system 110 of FIG. 1 may be able to receive and display television programming. Thus, the television channel and time and date of viewing could be transferred to the log server as the log data. Additionally, channel description information could also be forwarded, such as selected text from the closed captioning information, or an electronic television guide which could be transferred during the vertical blanking interval, or data from a preview channel.

Thus, the present invention provides a method and apparatus for remote network access logging and reporting. A record of log data identifying at least the host systems accessed, as well as possibly additional information, can be advantageously maintained at a remote location. The remote location can then be accessed by a supervisor at will, yet the data cannot be altered by an individual user because the data is stored remotely. Furthermore, access to particular host systems can advantageously be prevented based on an access list which is obtained from a remote location at the time the present invention begins running. Thus, the access list is maintained remotely, thereby inhibiting an individual who may attempt to alter the list.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

What is claimed is:

1. A method comprising:
   intercepting an access request at a client system to access information at a host system on a network, said access request originating at the client system;
   sending log data from the client system to a log server on the network, said log data to identify the access request; and
   receiving an access summary from the log server that summarizes at least a portion of the log data received from the client system.

2. The method of claim 1, wherein the access request is a request to access a world wide web page on the host system.

3. The method of claim 1, further comprising:

receiving an access list at the client system from the log server;

comparing the access request to the access list; and initiating an access from the client system to the host system only if the access request does not conflict with the access list.

4. The method of claim 1, further comprising the log server accessing the host system in response to the log server receiving the log data from the client system; and the log server obtaining site description information regarding the host system from the host system.

5. The method of claim 1, wherein the sending comprises:

comparing the access request at the client system to an access list received from the log server; and sending the log data from the client system to the log server only if the access request conflicts with the access list.

6. The method of claim 1, wherein the log data identifies a source of the access request and site description information corresponding to the access request.

7. The method of claim 1, further comprising:

the log server comparing the log data to a plurality of predetermined host systems; and the log server alerting a predetermined user in response to the log data matching at least one of the plurality of predetermined host systems.

8. The method of claim 7, wherein the alerting comprises sending an electronic mail message to the predetermined user.

9. A machine-readable medium having stored thereon a plurality of instructions, designed to be executed by a processor, for implementing a function, implementation of the function comprising:

intercepting an access request at a client system to access information at a host system on a network, said access request originating at the client system;

sending log data from the client system to a log server on the network, said log data to identify the access request; and receiving an access summary from the log server that summarizes at least a portion of the log data received from the client system.

10. The machine-readable medium of claim 9, wherein the access request is a request to access a specified file on the host system.

11. The machine-readable medium of claim 9, wherein implementation of the function further comprises:

receiving an access list at the client system from the log server;

comparing the access request to the access list; and initiating an access from the client system to the host system only if the access request does not conflict with the access list.

12. The machine-readable medium of claim 9, wherein implementation of the function further comprises:

comparing the access request at the client system to an access list received from the log server; and sending the log data from the client system to the log server only if the access request conflicts with the access list.

13. The system of claim 8 wherein the log server is further to store an access list, said client system to retrieve the access list from the log server and compare a first access request to the access list, said client system to send first log data identifying the first access request to the log server only if the first access request conflicts with the access list.

14. An apparatus comprising:

an interface to intercept an access request at a client system to access information at a host system on a network, said access request originating at the client system; and a logging process to send log data from the client system to a log server on the network, said log data to identify the access request, and said logging process to receive an access summary from the log server that summarizes at least a portion of the log data.

15. The apparatus of claim 14, wherein the access request is a request to access a particular file on the host system.

16. The apparatus of claim 14, wherein the logging process is also to retrieve an access list from the log server, compare the access request to the access list, and initiate an access from the client system to the host system only if the access request does not conflict with the access list.

17. The apparatus of claim 14, wherein the logging process is also to compare the access request at the client system to an access list received from the log server, and to send the log data to the log server only if the access request conflicts with the access list.

18. A system comprising:

a client system on a network to request access to information stored at a host system on the network; and a log server on the network to store an access log for the client system, said client system to send log data to the log server for addition to the access log to identify access requests made by the client system, said log server to sent an access summary to the client system that summarizes at least a portion of the log data received from the client system.

19. A system comprising:

a client system on a network to request access to information stored at a host system on the network; and a log server on the network to store an access list for the client system, said client system to retrieve the access list from the log server, compare a first access request to the access list, and initiate the first access request only if the first access request does not conflict with the access list, said log server further to store an access log for the client system, said client system to send log data to the log server for addition to the access log to identify access requests made by the client system, said client system further to send first log data identifying the first access request to the log server only if the first access request conflicts with the access list.

* * * * *

UNITED STATES PATENT AND TRADEMARK OFFICE
CERTIFICATE OF CORRECTION

PATENT NO.   : 6,122,740
DATED        : September 19, 2000
INVENTOR(S)  : Andersen et al.

It is certified that error appears in the above-identified patent and that said Letters Patent is hereby corrected as shown below:

Column 12,
Line 6, delete "claim 8 wherein" and insert -- claim 9 wherein --.

Signed and Sealed this

First Day of October, 2002

Attest:

Attesting Officer

JAMES E. ROGAN
Director of the United States Patent and Trademark Office